US006436538B1

(12) United States Patent
Takahashi et al.

(10) Patent No.: US 6,436,538 B1
(45) Date of Patent: Aug. 20, 2002

(54) NITROGEN DOPED CARBON-COATED EFFECT PIGMENTS AND THEIR MANUFACTURE

(75) Inventors: Ryuichi Takahashi, Kita-machi (JP); Adrian Schulthess, Tentlingen (CH); Kimiya Takeshita, Sanda (JP); Fritz Herren, Düdingen; Patrice Bujard, Basel, both of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/374,221

(22) Filed: Aug. 13, 1999

(30) Foreign Application Priority Data

Aug. 24, 1998 (EP) .......................................... 98810837

(51) Int. Cl.$^7$ ................................................. B32B 5/16
(52) U.S. Cl. ...................... 428/403; 427/212; 427/221; 428/407
(58) Field of Search ................................ 428/402, 407, 428/327, 403; 427/212, 221

(56) References Cited

U.S. PATENT DOCUMENTS

| 3,087,827 A | * | 4/1963 | Klenke et al. ............... 106/291 |
| 3,107,173 A | * | 10/1963 | Klenke et al. ............... 106/291 |
| 4,057,683 A | | 11/1977 | Elting ......................... 526/194 |

(List continued on next page.)

FOREIGN PATENT DOCUMENTS

| DE | 238 993 | 9/1986 |
| DE | 238 994 | 9/1986 |
| DE | 43 17 019 | 12/1993 |
| DE | 195 02 231 | 8/1995 |
| JP | 63 142066 | 6/1988 |
| WO | 96/3668 | 11/1996 |

OTHER PUBLICATIONS

Derw. Abst. 1993–408771 of JP 5306143.
Derw. Abst. 1978–07042A of JP 52146436.
Derw. Abst. 1983–42425K of JP 58049479.
Abst. Page of DE 43 17 019 (1993).
J. Amer. Chem. Soc. vol. 104, pp2031–4 (1982).
Chem. Of Materials, vol. 9, No. 2, pp. 399–402 (1997).

(List continued on next page.)

Primary Examiner—Hoa T. Le
(74) Attorney, Agent, or Firm—David R. Crichton

(57) ABSTRACT

The invention relates to a collection of composite platelet-like particles comprising a core and at least one coating layer consisting essentially of a compound having from 60 to 95% by weight of carbon and from 5 to 25% by weight of nitrogen, the balance to 100% being selected from elements of the group consisting of hydrogen, oxygen and sulfur.

The invention also relates to processes for the manufacture thereof, to polymer compositions containing it, and to the use thereof as effect pigments.

Preferably, the process for preparing the instant collection of particles comprises the steps of
(a) suspending plateletlike particles in a liquid;
(b) optionally adding a surface modifier, a polymerisation catalyst or both;
(c) before or after step (b), adding one or more polymers containing nitrogen and carbon atoms, or one or more monomers which are capable to polymerize to said polymer;
(d) effecting a polymeric coating layer to be formed on the surface of said plateletlike particles from the polymers or monomers added at step (c);
(e) isolating said plateletlike particles having said polymeric coating layer from the suspension; and
(f) heating said plateletlike particles having said polymeric coating layer to a temperature of from 100° C. to 1000° C. in a gaseous environment.

19 Claims, 1 Drawing Sheet

U.S. PATENT DOCUMENTS

| | | | | |
|---|---|---|---|---|
| 4,076,551 A | * | 2/1978 | Bernhard et al. | 106/291 |
| 4,315,959 A | | 2/1982 | Brandts Buys et al. | 427/214 |
| 4,764,544 A | * | 8/1988 | Carey et al. | 523/205 |
| 5,106,420 A | * | 4/1992 | Marshall, Jr. | 106/499 |
| 5,271,771 A | | 12/1993 | Franz et al. | 106/474 |
| 5,322,561 A | | 6/1994 | Prengel et al. | 106/475 |
| 5,364,467 A | | 11/1994 | Schmid et al. | 106/404 |
| 5,501,731 A | * | 3/1996 | Schmid et al. | 106/417 |
| 5,567,512 A | * | 10/1996 | Chen et al. | 428/332 |
| 5,626,661 A | * | 5/1997 | Schmid et al. | 406/415 |
| 5,662,738 A | | 9/1997 | Schmid et al. | 106/404 |
| 5,827,361 A | * | 10/1998 | Bernhardt et al. | 106/415 |

OTHER PUBLICATIONS

Die Angewandte Macromolekulare Chemie vol. 157, pp. 153–163 (1988).

W. Watt, Pl. & Polymer Conf. No. 4 (1971) pp. 23–31.

Derw. Abst. 007929 [02] of DD 238,994 (1986).

Derw. Abst. 007928 [02] of DD 238,993 (1986).

\* cited by examiner

NITROGEN DOPED CARBON-COATED EFFECT PIGMENTS AND THEIR MANUFACTURE

This invention relates to a collection of loose composite plateletlike particles comprising a core and at least one coating layer consisting essentially of a compound having from 60 to 95% by weight of carbon and from 5 to 25% by weight of nitrogen, the balance to 100% being selected from elements of the group consisting of hydrogen, oxygen and sulfur, as well as to processes for the manufacture thereof, to polymer compositions containing it, and to the use thereof as effect pigments.

Effect (or luster) pigments are reflective flat particles that show at least partly specular reflection of the incident light. In a surface painted with effect pigments, for example, the effect pigment particles in the paint usually orient themselves substantially parallel to the surface, so that the colored paint surface when illuminated by a fixed white light source shows a luster effect and may appear in different colors according to the angle at which it is viewed and the nature of the effect pigment. A high-quality coloured effect pigment should impart highly saturated colors to the medium in which it is incorporated at all viewing angles. An optically variable pigment should also have a large difference in color between different viewing angles (high goniochromaticity).

The visual difference between two colors is best reflected by the $\Delta E^*$ value in the $L^*a^*b^*$ color system (CIE-LAB 1986). Different types of effect pigments are able to impart effects to varying degrees; for example, simple metal particles, for example aluminium flakes, mainly produce differences in brightness (high $\Delta L^*$), which in combination with transparent colored pigments leads to the so-called metallic flop effect.

In effect pigments, color is mainly produced by interference of light. Such pigments are particles that have been coated with a thin layer of a colorless or colored substance; the color effect depends on the thickness of the coating layer and may manifest itself both in the brightness ($L^*$) and in the hue ($H^*$). The goniochromaticity arises because the optical path length of the reflected beam is different at different angles to the surface.

Interference pigments can be prepared from any known plate-like particles, for example from plate-like organic or inorganic colored pigments, such as β-copper phthalocyanine, 3,4,9,10-perylenetetracarboxylic acid diimides, fluororubins or $\alpha$-$Fe_2O_3$, from metal flakes, such as aluminium, copper or bronze flakes, or from silicatic particles.

However, the demands made of pigments are constantly increasing, so that the conventional effect pigments are unable fully to meet today's high expectations, particularly in high-quality applications such as automotive lacquers. For example, many effect pigments which would be desirable from the point of view of hue often exhibit inadequate light or weather stability, and many interference pigments are lacking chroma ($C^*$, saturation) and opacity.

In many cases, too, the mechanical strength of the effect pigments is not satisfactory. For example upon dispersion into an ink or paint composition, the coatings may break or peel off, leading to insatisfactory coloristics. This happens particularly with flat, smooth coatings which are desirable for coloristic reasons. Another problem is that it is very difficult to make relatively thick coatings without forming agglomerates, thus impairing the optical properties.

The preparation of fine black pigments through oxidative pyrolysis at 200–350° C. of acrylonitrile-based polymer particles treated with an adhering aminosiloxane is disclosed in JP-63/142066-A. This process leads to an uniformly shaped black powder, which contains only traces of nitrogen and does not produce any luster effect or goniochromaticity.

DD 238 994 discloses organophilic colored fillers consisting of small clay or kaolin particles ($\emptyset \leq 2 \mu m$) embedded in a matrix based on conducting polymers, which are obtained by calcination of a ceramic mass of clay and a polymer such as acrylonitrile at a temperature between 150° C. and 50° C. below the clay's decomposition point. Yet, these composite fillers are of brown to black color, without any luster effect or goniochromaticity, and their components are not arranged regularly.

DD 238 993 discloses organophilic colored fillers consisting of small clay or kaolin particles ($\emptyset < 2 \mu m$) embedded in a matrix containing amorphous carbon, which are obtained by calcination of a ceramic mass of clay and a polymer such as acrylonitrile at a temperature above the clay's decomposition point. Additional components such as mica may be contained in amounts up to 20% by weight. Yet, these composite fillers are of brown to black color, without any luster effect or goniochromaticity, and their components are not arranged regularly.

U.S. Pat. No. 5,322,561 relates to conductive flaky pigments, the conductive coating of which consists of a metal oxide pigment layer doped with additional metal oxide particles and containing interdispersed carbon black particles. The color is however black to pale and silvery grey, with quite a low chroma.

U.S. Pat. No. 3,087,827 discloses the deposition of carbon onto a $TiO_2$ layer from hydrocarbons, fatty acids, fats or soaps at 700–1000° C. The carbon fills into the minute spaces between the $TiO_2$ particles, even when deposited at the end of the process. Total absence of oxygen is required in order to avoid undesirable soot or particulate carbon formation. Moreover, the products are insatisfactory light stable as is known from U.S. Pat. No. 5,501,731.

U.S. Pat. No. 5,271,771 discloses carbon-containing effect pigments which are obtained through simultaneous deposition of carbon and a metal on a plate-like substrate, and subsequent redox reaction between the metal oxide in the pigment's undercoat and the metal in the pigment's topcoat, together with precipitation of carbon, at high temperatures under reducing conditions. It is however not possible to deposit the carbon-containing layer without altering the system's optical properties.

Dark effect pigments are known from DE-OS 195 02 231, which are coated with soot embedded in or overlaid with titanium oxide. They are obtained by coating a plateletlike core mechanically with soot particles, precipitating thereon titanium hydroxide and a metallic reducing agent, and pyrolizing the obtained composite at about 500–1000° C. under inert conditions. The chroma is somewhat improved but at the detriment of the lightness which is much too low.

U.S. Pat. No. 4,076,551 discloses pigments coated with a metal hydroxide or bismuth oxychloride layer and carbon black particles incorporated therein. Example 3 discloses a blue mica/$TiO_2$ interference pigment coated with 3% of carbon black and 0.73% $Al_2O_3$, which exhibits a strong dark blue powder color with a lively blue shimmer and may be heated to 300° C. for 40 minutes without any gloss or color change. However, the amount of carbon which can be fixed is limited and depends on the pigment's available surface area. For mica flakes, it does not exceed about 15 mg/m$^2$, the carbon in excess remaining in suspension and affecting the luster. In addition, it is very difficult to disperse the carbon black in aqueous media, and the coating is irregular, so that the color and the goniochromaticity do not meet today's requirements to a satisfactory extent.

U.S. Pat. No. 5,501,731 claims that some of above lacks may be solved by coating plateletlike silicatic substrates with carbon-containing metal compounds (such as $Cr^{III}acac_3$) and compounds of the formula $[(CH_2O)_{1-6}]_x$ (such as sugars or starch), and then decomposing the carbon-containing compounds on the surface of the substrate particles under oxygen-excluding conditions. Very smooth coatings can allegedly be obtained when the decomposition takes place from the gas phase. However, this process leads to coatings containing high amounts of a metal—the ratio Cr/C is 0.92 in example 1 and 1.50 in example 2. Consequently, it is only suitable for very thin layers, generally 1–20 nm, preferably 1–10 nm. Furthermore, a substantial amount of the metal is detached from the coating upon thermal decomposition, leading to a highly undesirable contamination with metallic particles which affect the coloristic properties and can be abrasive or develop an undesired catalytic activity when the pigment is incorporated into a high molecular weight organic material.

U.S. Pat. No. 5,364,467 and U.S. Pat. No. 5,662,738 finally disclose luster pigments based on plateletlike metallic substrates comprising a first layer of metal oxide, a second, nonselectively absorbing layer of carbon, metal or metal oxide, and optionally a third layer of metal oxide. There is however no example wherein the second layer is carbon. Notwithstanding the statement that a carbon layer may be made by thermal decomposition of a compound containing at least 1 oxygen for every 2 carbon atoms (such as PVA, sorbitol or sugars), this method does not enable to make regularly coated, isolated particles. Instead, very irregularly coated particles are obtained together with agglomerates which consist of several platelets linked together at different dihedric angles by a bridging carbonaceous mass. Consequently, the coloristic properties of these luster pigments are still not satisfactory.

The instant invention's object is to provide effect pigments that meet today's requirements to an especially high degree even in high-quality applications. The effect pigments according to the invention possess superior optical properties, such as high reflectivity, brilliance, luster and opacity. Those of the instant effect pigments which are coloured display a high chroma coupled with interesting flop effects, for example goniochromaticity. Their outstanding light stability and chemical and mechanical properties render them particularly suitable for use in all customary kind of substrates, including water-based coating systems, wherein there is surprisingly no need for an additional stabilizing treatment even in the case of metallic cores.

The invention relates to a collection of composite plateletlike particles comprising a core and at least one coating layer consisting essentially of a compound having from 60 to 95% by weight of carbon and from 5 to 25% by weight of nitrogen, the balance to 100% being selected from elements of the group consisting of hydrogen, oxygen and sulfur.

Said coating is hereafter also referred to as a nitrogen doped carbon coating.

The compound's carbon content is preferably from 70 to 90% by weight. The hydrogen content is preferably from 0.5 to 5% by weight. The nitrogen content is preferably from 13 to 22% by weight. The sulfur content is preferably below 1% by weight, most preferably nil. Preferably, there is a vast majority of loose particles, wherein a single core is surrounded by the instant nitrogen doped carbon coating. The number of loose particles is very preferably at least 80%, most preferably at least 95%, of the total number of loose and agglomerated particles. The nitrogen doped carbon coating around a core most preferably consists essentially of planar macromolecules arranged parallel to each other. Each core is preferably surrounded by one inventive coating.

Suitable core substrates for the luster pigments of the invention are transparent, partially reflectant or reflectant. Examples thereof are flat metallic or silicatic particles, graphite, $Fe_2O_3$, $MoS_2$, talc or glass flakes, and plateletlike crystals of β-phthalocyanine, fluororubine, red perylenes or diketopyrrolopyrroles. Silicatic particles are preferred, in particular light-colored or white micas, for example sericite, kaolinite, muscovite, biotite, phlogopite or related vermiculite, or any synthetic mica. Flakes of preferably wet-ground muscovite are particularly preferred, althought it is of course also possible to use other natural micas or artificial micas.

Another preferred embodiment is the use of flat metallic particles as the core. In contrast to previously known coatings, the instant coating can advantageously be made at temperatures below the melting point of the core metal, surprisingly enabling the preparation of perfectly shaped, coated metal flakes. Preferably, metal flakes are coated at temperatures below any phase change, as compared with their phase at room temperature.

Examples of suitable metallic particles are flakes of Ag, Al, Au, Cu, Cr, Fe, Ge, Mo, Ni, Si, Ti, or alloys thereof, such as brass or steel, preferably Al flakes. Depending on the material, a natural optically non-interfering oxide layer may form on the surface of metallic particle. Partially reflecting cores have preferably a reflectance of at least 35% of the light falling vertically on its surface in the range from 380 to 800 nm.

Surprising effects are obtained with all types of core materials. The cores may be colorless or colored and may consist of a single substance or of a combination of substances.

The instant pigments preferably also comprise an intermediate coating between the core and the nitrogen doped carbon coating, which intermediate coating may consist, for example, of one or more layers of Prussian blue, $MgF_2$ or, especially, of a metal or mixed-metal oxide or oxide hydrate. Such pigments are well known to the person skilled in the art, for example from DE 32 07 936, EP 0 096 284 or U.S. Pat. No. 5,026,429. The intermediate layer has preferably a thickness of from 0.01 to 1 μm.

On silicatic core particles, the intermediate layer consists preferably of a metal oxide, oxide hydrate or halide such as titanium, zirconium, tin, iron, chromium or zinc oxide, bismuth oxychloride or mixtures thereof, ontop which an optional protective layer may preferably also be applied to increase the stability, for example a layer of a metal oxide such as silicon or aluminium oxide. Of particular importance are micas, which are coated with highly refractive colorless metal oxides or oxide hydrates. Particularly preferred are intermediate coatings of zirconium dioxide or titanium dioxide; very particularly preferred is a coating of titanium dioxide. A very particular interest is given to micas having a dielectric coating layer of thickness from 0.03 to 0.3 μm.

The intermediate coating layer may also consist of a pack of multiple layers, for example from 2 to 20 layers. The skilled artisan knows many types of multiple layers, which are all suitable, and which effects can be obtained therewith. If desired, a layer of a colorless metal oxide or oxide hydrate can for example be combined with a layer of a colored metal oxide or oxide hydrate. Or, layers having a high refractive index (≧2.0) and layers having a low refractive index (≦2.0) may be alternated. Multiple layer coatings are generally known as Fabry-Perot systems, many of which are known also in pigments technology, such as in U.S. Pat. No. 5,135,812.

On metallic flakes, the intermediate layer consists preferably of a metal oxide, oxide hydrate or halide such as titanium, zirconium, tin, iron, chromium or zinc oxide, bismuth oxychloride or mixtures thereof particularly preferred is a coating of silicium dioxide.

Particles coated with the above intermediate layers and their use as effect pigments are generally known per se, for example from DE 14 67 468, EP 0 045 851, DE 32 37 264, DE 36 17 430, EP 0 298 604, EP 0 388 932 and EP 0 402 943. Metal oxide-coated mica platelets are also commercially available unter the names Iriodin® (E. Merck, Darmstadt), Flonac® (Kemira Oy, Finland), Mearlin® (Mearl Corporation, New York/USA) and Infinite Color® (Shisheido, Japan). Coated metal flakes are also commercially available unter the names Chroma Flair® (Flex Products, Inc, Santa Rosa, Calif./USA) and Paliochrom® (BASF, Germany).

The size of the core particles is not critical per se and can be adapted to the particular use. Generally, the particles have a length from about 1 to 200 μm, in particular from about 5 to 100 μm, and thicknesses from about 0.05 to 5 μm, preferably from 0.1 to 2 μm, in particular about 0.5 μm. Particles having a plateletlike shape are understood to be such having two essentially flat and parallel surfaces, with an aspect ratio length to thickness of from about 2:1 to about 1000:1, and a length to width ratio of from 3:1 to 1:1.

The nitrogen doped carbon coating may for example be prepared by any method known in the art, and then adsorbed onto the substrate particles, or may be prepared by methods known per se in the presence of the substrate particles, such as emulsion polymerisation. It is however preferably prepared directly on the plateletlike substrate particles, starting for example from monomers. With the latter new method, a much more regular coating is obtained and the number of loose particles is increased, giving surprising better coloristics.

The nitrogen doped carbon coating has for example a thickness of from 1 nm to 1 μm, preferably of from 1 nm to 300 nm. Further preferences for particular coating compounds are given below.

Above the nitrogen doped carbon coating, the instant effect pigments may optionally also be coated with an outer coating, which may consist of one or more layers of various materials according to the function to be performed. For example, the outer coating may consist of a transparent or selectively absorbing dielectric material of any kind, the specific electrical resistance of which according to the customary definition is at least $10^{10}\Omega\cdot cm$.

Where appropriate, the outer coating preferably consists of a metal oxide, oxide hydrate or metal fluoride, for example of $TiO_2$, $ZrO_2$, SiO, $SiO_2$, $SnO_2$, $GeO_2$, ZnO, $Al_2O_3$, $V_2O_5$, $Fe_2O_3$, $Cr_2O_3$, MgO, $MgF_2$, CuO or $PbTiO_3$, or a mixture thereof. Special preference is given to those metal oxides or oxide hydrates which are neither dissolved nor etched by the solvents used in many applications. Expediently, the outer coating should not impair the colorative properties of the coating system according to the invention located beneath it, but retain them as far as possible or even improve them. The person skilled in the art will know which material is suitable for which function, and which thicknesses are adequate.

The outer coating may protect the underlying coatings from chemical or mechanical influences. In this case, its refractive index is preferably as similar as possible to that of the external medium in which the pigment is intended to be embedded. Particularly preferred, the outer coating has a refractive index of from 1.33 to 1.71, although materials having high refractive indices may also be used. The thickness of a protective outer coating is most adequately no greater than 200 nm, preferably no greater than 100 nm, especially no greater than 50 nm.

The outer coating may, however, also reflect part of the incident light, or refract the incident light and the light reflected by the core, generating interference effects. In this case, its refractive index is preferably as high as possible, for example above 2.0. The thickness of a reflective outer coating is most adequately from 100 to 400 nm.

Of course, the outer coating may also consist of multiple layers, for example such as described above for the intermediate coating. When the outer coating consists of more than one layer, then it is preferably composed of alternate layers of a dielectric material and an instant nitrogen doped carbon coating or a semitransparent metal.

BRIEF DESCRIPTION OF THE DRAWINGS

All figures are schematic cuts orthogonal to the largest surface of the instant particles.

Figure 1:
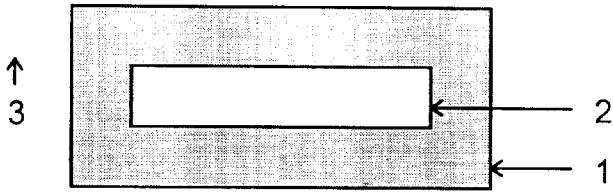
FIG. 1 shows a single composite particle with a nitrogen doped carbon coating [1] around an aluminium flake core particle [2]; around the particle, there is air as an outer medium [3].
Figure 2:
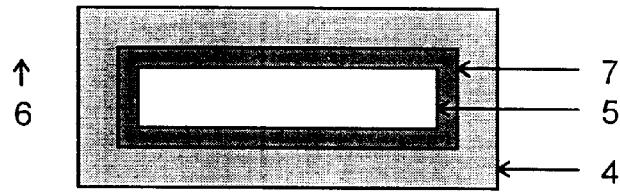
FIG. 2 shows a single particle with a nitrogen doped carbon coating [4] around a mica core particle [5]; around the particle, there is also air as an outer medium [6]; there is however an additional layer of $TiO_2$ [7] between the coating [4] and the inner core [5].
Figure 3:
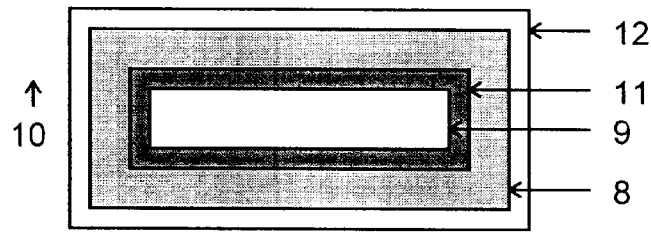
FIG. 3 shows a single particle with a nitrogen doped carbon coating [8] around a core particle [9] with an additional layer of $TiO_2$ [11] between the coating [8] and the core [9]; around the particle, there is also air as an outer medium [10]; there is however an additional layer of $SiO_2$ [12] on the coating [8].
Figure 4:
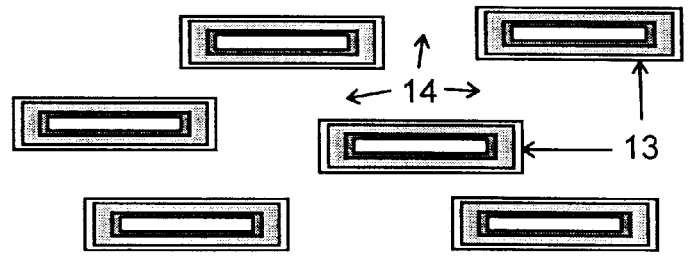
FIG. 4 shows several particles according to FIG. 3 embedded in a polymer layer [14].

The instant nitrogen doped carbon layers are best prepared by forming on the substrate particles a layer of a polymer containing nitrogen and carbon atoms, and then heating the substrate particles coated with the polymer containing nitrogen and carbon atoms under slightly oxydative conditions as described below.

Thus, the invention also relates to a process for preparing a collection of composite plateletlike particles comprising a core and at least one coating layer consisting essentially of a compound having from 60 to 95% by weight of carbon and from 5 to 25% by weight of nitrogen, the balance to 100% being selected from elements of the group consisting of hydrogen, oxygen and sulfur, comprising the steps of (a) suspending plateletlike particles in a liquid;

(b) optionally adding a surface modifier, a polymerisation catalyst or both;

(c) before or after step (b), adding one or more polymers containing nitrogen and carbon atoms, or one or more monomers which are capable to polymerize to said polymer;

(d) effecting a polymeric coating layer to be formed on the surface of said plateletlike particles from the polymers or monomers added at step (c);

(e) isolating said plateletlike particles having said polymeric coating layer from the suspension; and (f) heating said plateletlike particles having said polymeric coating layer to a temperature of from 100° C. to 1000° C. in a gaseous environment.

With this process, it is surprisingly possible to form very consistent, regular nitrogen doped carbon coatings of thickness from 1 nm to 1 μm, preferably from 1 nm to 300 nm. There is no need for complex and expensive equipment, such as necessary for vapor deposition.

The plateletlike particles may be any core particles as described above. It is possible, and in many cases most convenient, to use already coated plateletlike particles, many of which are commercially available. In this case, the starting particles' coating should preferably be chosen according to the desired intermediate coating of the instant pigments. Following known methods, it is however also possible to modify the starting particles' coating between steps (a) and (b), for example to etch the surface or the upper layer, or to add one or more coating layers. This enables to manufacture an extremely broad choice of effect pigments.

The liquid may for example be any usual solvent which does not react with the other chemicals used in the instant process, apart of with a reactive metal compound if applicable. Examples of liquids are water or customary organic solvents, for example ethers, alcohols, ketones, nitrites, nitro compounds, unsubstituted or substituted aliphatic or aromatic hydrocarbons, or mixtures thereof. Usual liquids are known to the skilled artisan and can be found in handbooks, such as Techniques of Chemistry, vol II Organic Solvents, 3$^{rd}$ ed. Arnold Weissberger, Wiley-lnterscience 1970. Suitable liquids are such wherein the polymeric coating to be formed is not totally soluble. Preferred liquids are $C_1$–$C_4$alcohols, water and mixtures thereof, water being most preferred. The amount of liquid is not critical at all, and may vary for example from 1 to 1000 parts by weight, based on the weight of the plateletlike particles.

Surface modifiers may for example be surfactants, acids or bases, reactive metal compounds or polar polymers. Suitable surfactants are for example neutral, cationic, anionic or amphoteric surfactants. Suitable acids or bases are for example mineral or organic acids, such as phosphoric acid, acetic acid or sebacic acid, or mineral or organic bases, such as sodium hydroxide, ammonia or primary, secondary or tertiary amines.

Suitable reactive metal compounds are such which bond to or form a deposit of metal oxide, oxide hydrate or hydroxide on the surface of a substrate particle in the presence of the liquid, which may be involved in the reaction as long as it does not totally inhibit it. For example, N-(3-(trimethoxysilyl)-propyl)pyrrole may be used, which is known from J. Amer. Chem. Soc. 104, 2031–4 (1982) and Chemistry of Materials 9/2, 399–402 (1997) to anchor polypyrroles on n-type semiconductors such as silicon and silicon oxide, or titanium or zirconium salts such as Ti(OiPr)$_4$ or Zr(acac)$_4$.

Suitable polar polymers are for example compounds having a molecular weight (M$_w$) of from about 1000 to about 100000 and repeating units carrying polar groups, such as polyvinyl alcohol, cellulose or derivatives thereof. Most preferred are polyvinyl alcohol derivatives, for example a polyvinyl alcohol with sulfonate or silanol groups, and cellulose derivatives, for example carboxymethylcellulose or cellulose thiocarbonate.

Additional chemicals may be added to facilitate surface modification through reactive metal compounds, for example acids or bases, preferably ammonia or primary, secondary or tertiary amines. Highly surprisingly, it has now been found that amines of formula

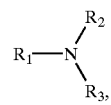

wherein $R_1$, is hydrogen or a group $R_4$, $R_2$ and $R_3$ are each independently a group $R_4$, and $R_4$ is [-1,2-$C_2$–$C_3$ alkylen-T-]$_n$-H wherein T is O or NH and n is a number from 1 to 3, give excellent results in combination with compounds having a functional group

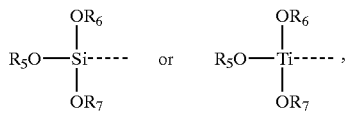

wherein $R_5$ to $R_7$ are each $C_1$–$C_4$alkyl.

Hence, the invention also relates to a process for coating a surface through graft polymerization, characterized in that before graft polymerization, said surface is modified, in the presence of an amine of formula

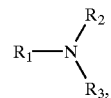

wherein $R_1$ is hydrogen or a group $R_4$, $R_2$ and $R_3$ are each independently a group $R_4$, and $R_4$ is [-1,2-$C_2$–$C_3$ alkylen-T-]$_n$-H wherein T is O or NH and n is a number from 1 to 3, by a compound having a functional group

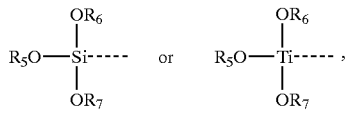

wherein $R_5$ to $R_7$ are each $C_1$–$C_4$alkyl. The amount of amine is preferably from 5 to 500 g/m$^2$ of surface of the substrate particle. The amount of the trialkoxysilane compound is preferably from 0.1 to 2 g/m$^2$ of surface of the substrate particle. The adequate reaction temperature is from −20 to 150° C., preferably from 20 to 80° C., most preferably from 50 to 80° C. The reaction time is adequately from about ¼ to about 100 hours, preferably from 1 to 10 hours.

$R_1$ is preferably hydrogen. $R_4$ is preferably ethylene T is preferably O. n is preferably 1. $R_5$ to $R_7$ are preferably methyl or ethyl. Most preferred are combinations of two or more preferred features. Preferably, ammonia is also added to improve the surface modification even further. The modified surfaces are particularly well suited as substrates for graft polymerisation. The graft polymers obtained thereon do surprisingly adhere better to the substrate, and they are very homogeneous and substantially of constant thickness.

Polymerisation catalysts are for example thermo- or photoinitiators, as well as graft polymerisation catalysts, such as compounds of transition metal elements and lanthanides having multiple oxidation states and capable of undergoing a redox reaction with suitable reagents, for example compounds of Ti, V, Cr, Mn, Fe, Co, Ni, Cu, Nb, Tc, Pd, Re, Os, Ir, Pt, Au, Hg, Ce, Sm, Eu and Yb. Preferred polymerisation catalysts are salts of Ce$^{III}$ or Ce$^{IV}$. It is known, which polymerisation catalysts are suitable for polymerizing which of the monomers used in the instant invention.

It is preferred that both a surface modifier and a polymerisation catalyst are added in step (b), which is preferably performed, most preferably before step (c).

The polymer containing nitrogen and carbon atoms has preferably unsaturated bonds.

Examples are a polypyrrole, a polyamide, a polyaniline, a polyurethane, a nitrile rubber or a melamin-formaldehyde resin, which may be used alone in mixtures together with other polymers, such as polythiophene, polyacetylene, polyparaphenylene or polyparaphenylene-sulphide. Preferred polymers are homo- and copolymerisates of acrylonitrile, acrylamide, methacrylonitrile, methacrylamide, crotononitrile and crotonamide, such as, most preferred, polyacrylonitrile. The monomer capable to polymerize to said polymer is for example a pyrrole derivative, acrylonitrile, methacrylonitrile, crotononitrile, acrylamide, methacrylamide or crotonamide, preferably acrylonitrile, methacrylonitrile or crotononitrile, most preferably acrylonitrile.

All above-mentioned liquids, surfactants, reactive metal compounds, polar polymers, thermo-and photoinitiators, graft polymerisation catalysts, and nitrogen containing polymers and monomers are known compounds, most of which are commercially available.

Effecting the polymeric coating layer to be formed is performed in analogy to methods which are known per se and depend on the materials added in step (c) and optionally (b). Polar polymers may for example be coated by simply stirring at a temperature of from 0 to 100° C. Emulsion or graft polymerization require more sophisticated procedures, which are however also known per se. U.S. Pat. No. 4,057,683 discloses the graft polymerisation of vinyl polymers on inorganic substrates having hydroxy groups. Die Angewandte Macromolekulare Chemie 157, 153–163 (1988) discloses vinyl grafting onto cotton fabric using ceric-cellulose thiocarbonate redox system. U.S. Pat. No. 4,315,959 discloses the graft polymerisation of methyl methacrylate onto $TiO_2$ coated with a first layer of polyvinyl alcohol and a transition metal complex.

Isolating the coated particles is done by standard methods, such as for example filtrating or centrifugating, then washing the residue with a common solvent or with water and drying, for example batchwise in an oven or continuously in a spray-dryer.

The coated particles are then preferably heated to a temperature of from 100° C. to 1000° C. in a gaseous environment. The preferred temperature range is from 150 to 600° C. In this step, most hydrogen atoms and hydroxy groups are eliminated, and the coating gets a high degree of unsaturation and crosslinking, as well as a very dark color. In an ideal case, the whole coating around each core becomes completely unsaturated, with as much conjugated double bonds as possible. Generally, the temperature suitable for obtaining this result is known for the bulk nitrogen containing polymers or might be chosen in analogy thereto for related materials. Alternatively or in addition to heating, equivalent treatments having the same result may also be used.

The gaseous environment ensures that there is a minimum of contact between the particles during step (f). It is preferred to slightly agitate the particles, for example in a fluidized bed, in order that gravity does not cause them to stick together. High shear and high pressures on the particles should suitably be avoided. The gas to be used depends on the temperature and should not induce a reduction. It is preferred to use an oxygen-containing gas, such as air, at temperatures of from 100° C. to 300° C., and inert gasses, such as nitrogen or argon, at temperatures from about 200 to 1000° C. If the temperature should exceed 300° C., then it is preferred to heat in 2 steps, an oxygen-containing gas being used up to a temperature of from 200 to 300° C., and an inert gas afterwards when the temperature is increased above it. This 2-step heating process, which has been disclosed to increase the yield of carbon fibers [presentation by W. Watt at the Plastics & Polymer Conference n° 4 (1971)], gives particularly surprising good results in the case of polyacrylonitrile coatings.

The duration of the heat treatment depends on the coating's chemical constitution as well as from the equipment to be used. It may vary from as short as a few seconds (such as 10 s) to a few days (such as 1 week). Preferably, for batch operations reaction times from ½ to 30 h are chosen, reaction times from 1 to 10 h being most preferred.

Highly surprising it has been found, that it is possible to obtain very regular, homogeneous and continuous coatings in an extremely wide range of thicknesses. Coatings of, for example, polypyrrole or pyrolysed polyacrylonitrile, the thickness of which is below 1 $\mu$m, are new. Instant coatings of conductive polymers, the thickness of which is below 300 nm, preferably below 50 nm, can be used very advantageously not only in pigment technology but also in other applications, for example in optical devices such as displays.

The luster pigments and luster pigment mixtures of the present invention are advantageously useful for many purposes, such as the coloring of plastics, glasses, ceramic products, decorative cosmetic preparations and particularly coatings, especially automotive coatings, and inks, especially security printing inks. All customary printing processes can be employed, for example screen printing, intaglio printing, bronze printing, flexographic printing and offset printing.

The pigments of the present invention are also advantageously useful for these purposes in admixture with transparent and hiding white, colored and black pigments and also commercial transparent, colored and black luster pigments based on metal oxide-coated mica and metal pigments, platelet-shaped iron oxides, graphite, molybdenum sulfide and platelet-shaped organic pigments.

The pigment according to the invention can be embedded with excellent results in any high molecular weight organic material for the pigmenting thereof. Such high molecular weight organic materials are described hereinafter. The amount of high molecular weight organic material may be as desired and is, for example, from $10^{-3}$ to $10^3$ parts by weight, preferably from $10^{-2}$ to $10^2$ parts by weight, based on 1 part by weight of pigment according to the invention. The substance compositions according to the invention may comprise other customary constituents, for example wetting agents or texture-improving agents, the amount of which may be as desired, but is preferably from 0 to 30% by weight in total, based on the total weight of the substance composition.

The pigment according to the invention is embedded in the high molecular weight organic material, for example, by mixing or dispersing, if desired in the presence of a suitable liquid which can be removed again once the dispersion is complete. If desired, stirrers or roller mills or any other customary mixing devices may be used as dispersing devices for that purpose.

If desired, a cationic, anionic, zwitterionic or non-ionic wetting agent of any kind may be added to the dispersion mixture. The substance compositions according to the invention can be isolated from the dispersion mixture, for example, by filtration or concentration by evaporation of the liquid.

The high molecular weight organic material for the pigmenting of which the pigments or substance compositions according to the invention may be used may be of natural or synthetic origin. It may involve, for example, natural resins, drying oils, rubber or casein, or natural substances modified thereby, such as chlorine rubber, oil-modified alkyd resins, viscose, and cellulose ethers or esters, such as ethyl cellulose, cellulose acetate, cellulose propionate, cellulose acetobutyrate or nitrocellulose, but especially fully synthetic organic polymers (duroplastics and thermoplastics), as are obtained by polymerisation, polycondensation or polyaddition. From the class of the polymerisation resins there may be mentioned especially polyolefins, such as polyethylene, polypropylene or polyisobutylene, also substituted polyolefins, such as polymers of vinyl chloride, vinyl acetate, styrene, acrylonitrile, acrylic acid or methacrylic acid esters or butadiene, and copolymers of the mentioned monomers, such as, especially, ABS or EVA.

Of the group of the polyaddition resins and polycondensation resins there may be mentioned the condensation products of formaldehyde with phenols, the so-called phenol plastics, and the condensation products of formaldehyde with urea, thiourea and melamine, the so-called aminoplastic resins, the polyesters used as surface-coating resins, and both saturated, for example alkyd resins, and unsaturated, for example maleic resins, also linear polyesters and polyamides, polyurethanes or silicones.

The mentioned high molecular weight compounds may be present individually or in mixtures, in the form of plastic masses or melts. They may also be in the form of their monomers or in the polymerised state in dissolved form as film formers or binders for paints or printing inks, for example boiled linseed oil, nitrocellulose, alkyd resins, melamine resins and urea-formaldehyde resins or acrylic resins.

Depending on the intended application, it proves advantageous to use the effect pigments or effect pigment compositions according to the invention as toners or in the form of preparations. Depending on the conditioning process or intended application, it may be advantageous to add specific amounts of texture-improving agents to the effect pigment before or after the conditioning process, provided that such agents do not have an adverse effect when the effect pigments are used in the dyeing of high molecular weight organic materials, especially polyethylene. There come into consideration as such agents especially fatty acids having at least 18 carbon atoms, for example stearic acid or behenic acid, or their amides or metal salts, especially magnesium salts, as well as plasticisers, waxes, resin acids, such as abietic acid, colophonium soap, alkylphenols or aliphatic alcohols, such as stearyl alcohol or aliphatic 1,2-dihydroxy compounds having from 8 to 22 carbon atoms, such as 1,2-dodecanediol, also modified colophonium maleic resins or fumaric acid colophonium resins. The texture-improving agents are preferably added in amounts of from 0.1 to 30% by weight, especially from 2 to 15% by weight, based on the end product.

Accordingly, the invention relates also to a substance composition comprising an effective pigmenting amount of a pigment as defined above and a high molecular weight organic material. In general, the pigment is contained in the substance composition in the form of a plurality of individual pigment particles surrounded by organic material.

The pigment according to the invention may be contained in the substance composition according to the invention in an amount of from 0.01 to 70% by weight, based on the high molecular weight organic material. If the pigment according to the invention has an outer coating consisting of a high molecular weight organic material, then that material and the high molecular weight organic material that is to be pigmented may be different or, preferably, identical. If the two high molecular weight organic materials are different, it is advisable to ensure that they are readily compatible. The person skilled in the art will know which high molecular weight organic materials are compatible with one another. In that case, it is especially preferable for the two high molecular weight organic materials to have similar refractive indices.

If the substance composition according to the invention is subjected to further processing undiluted as a pigmented high molecular weight organic material, then the amount of pigment according to the invention is preferably from 0.1 to 20% by weight, based on the total weight of the substance composition according to the invention. If, by contrast, the substance composition according to the invention is used as a master batch for pigmenting another high molecular weight organic material, then the amount of pigment according to the invention is preferably from 20 to 70% by weight, based on the total weight of the substance composition according to the invention.

For the pigmenting of organic materials, the effect pigments or effect pigment compositions according to the invention may be used on their own. However, it is also possible, for the purpose of achieving different shades of color or color effects, to add to the high molecular weight organic substances, in addition to the effect pigments or effect pigment compositions according to the invention, other coloring constituents, such as white, colored, black or effect pigments in any desired amounts. If colored pigments are used in admixture with the pigments or substance compositions according to the invention, then the total amount is preferably from 0.1 to 20% by weight, based on the high molecular weight organic material. The preferred combination of an effect pigment according to the invention with a colored pigment of a complementary color has especially high goniochromaticity, test coatings of the effect pigment and test coatings of the colored pigment having a difference in hue ($\Delta H^*$) of from 150 to 210.

Colour values relate to the CIE $L^*a^*b^*$ ($L^*C^*H^*$) color coordinates for normal light type D65 and CIE 1964 10°-observer ($D_{65}^{10°}$).

The pigmenting of the high molecular weight organic substances using the pigments or substance compositions according to the invention is carried out, for example, as follows: such a pigment or such a substance composition, if desired in the form of a master batch, is mixed with those substrates using roller mills, mixing apparatuses or grinding apparatuses. The pigmented material is then brought into the desired final form by methods known per se, such as calendering, compression moulding, extrusion, coating, casting or injection moulding. Any additives customary in the plastics industry, for example plasticisers, fillers or stabilisers, may be incorporated into the polymers in the usual amounts before or after incorporation of the pigment. In particular, in order to prepare non-rigid mouldings or to reduce their brittleness, it is desirable to incorporate plasticisers, for example esters of phosphoric acid, phthalic acid or sebacic acid, into the high molecular weight compounds before shaping.

For the pigmenting of paints and printing inks, the high molecular weight organic materials and the effect pigments or effect pigment compositions according to the invention, if desired together with customary additives, for example fillers, other pigments, siccatives or plasticisers, are finely dispersed or dissolved in a common organic solvent or solvent mixture. It is possible for the individual components to be dispersed or dissolved separately, or for several components to be dispersed or dissolved together, and only then for all the components to be combined.

When dispersing an effect pigment according to the invention in the high molecular weight organic material to be pigmented, and when processing a substance composition according to the invention, it is preferable to maintain conditions under which only relatively low shear forces occur, so that the effect pigment is not comminuted into smaller fragments. The permissible shear force corresponds approximately to that which is permissible for the flat core, the gentle dispersion of which in a high molecular weight organic material is generally well known to the person skilled in the art.

The resulting color effects, for example in plastics, paints or ink prints, preferably in paints or ink prints, especially in paints, are distinguished by excellent properties, especially by high brilliance, reflectivity and opacity as well as excellent color fastness as mentioned above.

Accordingly, the invention relates also to a method for pigmenting high molecular weight organic material by incorporating an effective pigmenting amount of an effect pigment according to the invention or of an effect pigment composition according to the invention into said high molecular weight organic material.

If the high molecular weight material to be pigmented is a paint, then it is especially a speciality paint, especially an automotive lacquer.

The Examples which follow explain the invention, without limiting it to any extend. All proportions are by weight unless specified differently.

EXAMPLE 1

10 g of mica coated with $TiO_2$ (®Iriodin 231, Merck) are suspended in 200 g of a 2% by weight aqueous solution of sulfonate-modified polyvinyl alcohol (®SK-5102, Kuraray) for 1 hour at room temperature to obtain the adsorbed polyvinyl alcohol on the mica flakes. After separation of flakes from the suspension, the flakes are thoroughly washed with water and suspended again in 200 g of a 0.4% aqueous solution of sodium dodecyl sulfate. The pH of the suspension is adjusted to 2.0 with 1M aqueous $HNO_3$ and 15 ml of acrylonitrile are added. 14 ml of a 0.4M ceric ammonium nitrate solution in 0.05M $HNO_3$ are slowly added dropwise to the suspension and the mixture is stirred. The graft polymerization of acrylonitrile onto the flakes is allowed to proceed at room temperature under nitrogen atmosphere for 6 hours. After polymerization, the flakes are washed with water and methanol and then three times with N,N-dimethylformamide to remove ungrafted polyacrylonitrile.

The polyacrylonitrile-coated flakes are heated at 260° C. for 2 hours under air in an electric furnace. The final product contains 3.5% of carbon, 0.3% of hydrogen and 1.2% of nitrogen and has an intense green interference color.

EXAMPLE 2

A polyacrylonitrile coating is prepared according to Example 1, except that ®Iriodin 231 is replaced by ®Iriodin 221 (Merck). The pigment obtained has 3.9% of carbon, 0.4% of hydrogen and 1.4% of nitrogen and shows a deep blue interference color.

EXAMPLE 3

A polyacrylonitrile coating is prepared according to Example 1, except that ®Iriodin 231 is replaced by ®Iriodin 211 (Merck). The pigment obtained has a deep red interference color.

EXAMPLE 4

10 g of mica coated with $TiO_2$ (®Iriodin 9235 WRII, Merck) are suspended in 200 g of a 2% aqueous solution of sodium polystyrene-(4)-sulfonate (®oversa TL-502, National Starch) for 5 hours at room temperature to get the sodium polystyrene-(4)-sulfonate adsorbed on the mica flakes. After separation from the suspension, the flakes are again suspended for 5 hours at room temperature in 200 g of a 2% aqueous solution of a cationic polyvinyl alcohol (®C-318, Kuraray). They are separated, thoroughly washed with water and suspended in 105 g of a 0.7% aqueous solution of sodium dodecyl sulfate. 20 ml of 0.006M ceric ammonium nitrate in 1M $HNO_3$ are added into the suspension. After 1 minute aging, 3 ml of acrylonitrile are added and the mixture is stirred. The graft polymerization of acrylonitrile onto the flakes is allowed to proceed at room temperature under nitrogen atmosphere for 4 hours. After polymerization, the flakes are washed with water and methanol. The polyacrylonitrile-coated flakes are heated for 6 hours to 260° C. under air in an electric furnace. They are further pyrolized at 800° C. for 2 hours under nitrogen flow. The final product has an intense green interference color.

EXAMPLE 5

A polyacrylonitrile coating is prepared according to Example 4, except that ®Iriodin 9235 WRII is replaced by ®Iriodin 9225 WRII (Merck). The pigment obtained has a brilliant blue interference color.

EXAMPLE 6

A polyacrylonitrile coating is prepared in the same manner as Example 4, except that ®Iriodin 9235 WRII is replaced by ®Iriodin 9215 WRII (Merck). The pigment obtained has a brilliant red interference color.

EXAMPLE 7

3 g of $SiO_2$-coated Al flakes are suspended for 1 hour at 50° C. in 200 g of a 1% aqueous solution of a silanol-modified polyvinyl alcohol (®R-1130, Kuraray). After separation from the suspension, the flakes are thoroughly washed with water and suspended again in 100 g of a 1% aqueous solution of sodium dodecyl sulfate. The pH of the suspension is adjusted to 2.0 with 1N $HNO_3$ and 12 ml of acrylonitrile are added. 12 ml of a 0.4M ceric ammonium nitrate in 0.05N $HNO_3$ are added dropwise to the suspension and the mixture is stirred. The graft polymerization of acrylonitrile onto the flakes is allowed to proceed at room temperature under nitrogen atmosphere for 6 hours. After polymerization, the flakes are washed with water and methanol and then three times with N,N-dimethylformamide to remove ungrafted polyacrylonitrile. The polyacrylonitrile-coated flakes are heated to 260° C. for 6 hours under air in an electric furnace. They are further pyrolized at 600° C. for 2 hours under nitrogen flow. The final product has an intense green interference color which, at steeper angles, flops to a blue hue.

EXAMPLE 8A 3 g of mica coated with $TiO_2$ (®Iriodin 100, Merck) are suspended in 200 g of an 1% aqueous solution of a silanol-modified polyvinyl alcohol (®R-1130, Kuraray) for 1 hour at 50° C. The flakes are thoroughly washed with water and suspended again in 100 g of a 2% aqueous solution of sodium dodecyl sulfate. The pH of the suspension is adjusted to 2.0 with 1N $HNO_3$ and 4 ml of acrylonitrile are added. 2 ml of 0.4M ceric ammonium nitrate in 0.05N HNO$_3$ are added dropwise to the suspension and the mixture is stirred. The graft polymerization of acrylonitrile onto the flakes is allowed to proceed at room temperature under nitrogen atmosphere for 6 hours. After polymerization, the flakes are washed with water and methanol and then three times with N,N-dimethylformamide to remove ungrafted polyacrylonitrile. The polyacrylonitrile-coated flakes are heated to 260° C. for 6 hours under air in an electric furnace. They are further pyrolized at 800° C. for 2 hours under nitrogen flow. The final product has a shiny black color.

EXAMPLE 8B 2.0 g of the final product of Example 8A are further subjected to a heat treatment at 300° C. for 3 hours under air flow. The flakes are then suspended in a solution of 4.0 g of titanium tetraisopropoxide and 0.56 g diisopropanolamine in 56 ml of isopropanol. The suspension is refluxed and then a solution of 2.6 ml of water in 28 ml of isopropanol is added dropwise in the course of 3 hours to the suspension. Violet flakes are obtained.

EXAMPLE 9

10 g of mica coated with TiO$_2$ (®Iriodin 9235 WRII, Merck) are suspended in 200 g of a 2% aqueous solution of sodium polystyrene-(4)-sulfonate (®Versa TL-502, National Starch) for 5 hours at room temperature to get the polystyrene sulfonate adsorbed on the mica flakes. After separation from the suspension, the flakes are again suspended in 200 g of a 0.5% aqueous solution of a cationic cellulose (®H-100, National Starch) for 5 hours at room temperature. They are separated and thoroughly washed with water and suspended in 60 g of a 1% aqueous sodium hydroxide solution. 10 ml of carbon disulfide are added to the suspension, which is stirred under nitrogen at 40° C. for 1 hour. The flakes are washed with water and suspended in 30 ml of water. 10 ml of a 0.006M ceric ammonium nitrate solution in 0.05N HNO$_3$ is added dropwise to the suspension. After 3 minutes, the flakes are washed with water and suspended in 64 ml of dioxane. 1.6 ml of 1N HNO$_3$ and 23 ml of acrylonitrile are added and nitrogen is bubbled through the solution. The mixture is stirred and allowed to stand at 80° C. under nitrogen for 2 hours. After polymerization, the flakes are washed with water and methanol. The polyacrylonitrile-coated flakes are heated to 260° C. for 6 hours under air in an electric furnace. They are then further pyrolized at 800° C. for 2 hours under nitrogen flow. The final product has a green color.

EXAMPLE 10

10 g of SiO$_2$-coated Al flakes are suspended in 63 ml of ethanol. 30 g of a 42% methanolic solution of [3-(trimethoxysilyl)propyl]octadecyldimethylammonium chloride, 10 ml of water and 1 ml of acetic acid are added to the suspension, which is refluxed for 5 hours. After separation from the suspension, the flakes are thoroughly washed with water and suspended in 200 g of a 2% aqueous solution of sodium polystyrene-(4)-sulfonate (®Versa TL-502, National Starch) for 5 hours at room temperature to get the polystyrene sulfonate adsorbed on the mica flakes. After separation, the flakes are again suspended in 200 g of a 0.5% aqueous solution of a cationic cellulose (®CH-100, National Starch) for 5 hours at room temperature. They are separated and thoroughly washed with water and suspended in 100 ml of an aqueous solution of 10% sodium hydroxide. 10 ml of carbon disulfide are added to the suspension which is stirred under nitrogen at 40° C. for 1 hour. The flakes are washed with water and suspended in 30 ml of water. 10 ml of a 0.006M ceric ammonium nitrate solution in 0.05N HNO$_3$ are added dropwise to the suspension. After 3 minutes, the flakes are washed with water and suspended in 64 ml of dioxane. While stirring, 1.6 ml of 1N HNO$_3$ and 30 ml of acrylonitrile are added and nitrogen is bubbled through the reaction mixture, which is then allowed to stand for 2 hours at 80 ° C. under nitrogen. After polymerization, the flakes are washed with water and methanol. The polyacrylonitrile-coated flakes are heated to 260° C. for 6 hours under air in an electric furnace. They are further pyrolized at 600° C. for 2 hours under nitrogen flow. The final product has green color which flops to blue at steeper angle.

EXAMPLE 11

A polyacrylonitrile coating is prepared according to Example 4, except that ®Iriodin 9235 WRII is replaced by Iriodin 100 (Merck). The flakes obtained are shiny gray. They are subjected to heat treatment at 300° C. for 3 hours under air flow. They are then suspended in a solution of 10.7 ml of 2.5% aqueous ammonia, 17.1 ml of water and 5.1 g of diethanolamine in 280 ml of isopropanol. The suspension is heated to 60° C., and a solution of 35.9 ml of tetraethoxysilane in 80 ml of isopropanol is then added dropwise in the course of 5 hours. The pale green flakes are isolated and then suspended in 63 ml of ethanol. 30 g of a 42% methanolic solution of [3-(trimethoxysilyl)propyl] octadecyldimethylammonium chloride, 10 ml of water and 1 ml of acetic acid are then added to the suspension, which is refluxed for 5 hours. The flakes are separated, thoroughly washed with water and suspended in 200 g of a 2% aqueous solution of sodium polystyrene-(4)-sulfonate (®Versa TL-502, National Starch) for 5 hours at room temperature to get the polystyrene sulfonate adsorbed on the mica flakes. After separation from the suspension, the flakes are again suspended in 200 g of a 2% aqueous solution of a cationic polyvinyl alcohol (®C-318, Kuraray) for 5 h at room temperature. They are separated again, thoroughly washed with water and suspended in 106 g of a 0.7% aqueous solution of sodium dodecyl sulfate. The pH of the suspension is adjusted to 2.0 with 1N HNO$_3$ and 20 ml of 0.006M ceric ammonium nitrate in 0.05N HNO$_3$ are added. After 1 minute, 5 ml of acrylonitrile are added dropwise to the suspension while stirring. The graft polymerization of acrylonitrile onto the flakes is allowed to proceed at room temperature under nitrogen atmosphere for 4 hours. After polymerization, the flakes are washed with water and methanol. The polyacrylonitrile- coated flakes are heated to 260° C. for 6 hours under air in an electric furnace. They are then further pyrolized at 800° C. for 2 h under nitrogen flow. The final product exhibits an intense violet which flops to yellow at steeper angle.

EXAMPLE 12A 15 g of an Al flake paste (®SSP 3622, Silberline/GB, 66% solids) is made into a slurry in 100 ml of isopropanol and stirred for 10 min at room temperature. The major part of the solvent is decanted off and the process is repeated. To disperse the flakes as well as possible, the slurry can be left standing for 10 min under ultrasound or overnight, or it may be dispersed using a toothed-disk impeller for 30 min at 2000 rpm. The pretreatments are optional and merely help to achieve as good a dispersion of the flakes as possible.

140 ml of isopropanol, 15 g of tetraethoxysilane and 1.77 g of 3-aminopropyltriethoxysilane are then added. The suspension is stirred mechanically at 400 rpm and heated to 60° C. A solution consisting of 40 ml of isopropanol, 0.356 g of 25% ammonia and 12.3 g of water is added dropwise to the 60° C. warm suspension over 3 h.

After 3 hours, the flakes are isolated by filtration, washed with 2×100 ml of ethanol and 100 ml of acetone and then dried at 100 mbar for 12 h at 120° C., giving 14 g of coated aluminium flakes.

EXAMPLE 12B

The procedure of Example 12A is repeated, but carrying out the filtration only after 10 h (instead of after 3 h).

EXAMPLE 13A

In a 1 liter flask, fitted with a water separator and reflux condenser, 5 g of $SiO_2$-coated flakes of EXAMPLE 12A are suspended in 500 ml of a 1% solution of phenylaminopropyltrimethoxysilane in toluene and is refluxed with stirring for 2 h and heated. About 250 ml of toluene are then distilled off and heated again for 1 h under reflux. The toluene is then distilled off up to about 30 ml. The suspension is filtered and washed thoroughly with toluene, ethanol and acetone. The flakes are dried at 120° C./1 mbar. The yield is quantitative.

EXAMPLE 13B

The procedure of Example 13A is repeated, but using the product of Example 12B instead of the product of Example 12A, with comparable result.

EXAMPLE 14

The procedure of Example 13A is repeated, but using N-(3-(trimethoxysilyl)propyl)pyrrole) instead of phenylaminopropyltrimethoxysilane.

EXAMPLE 15A

In a 50 ml flask, fitted with reflux condenser, thermometer and dropping funnel, 1 g of the aluminium flakes prepared according to Example 13B are suspended in a solution of 70 mg $(NH_4)_2S_2O_8$ in 10 ml of 1.2N HCl. With stirring, the sample is cooled to 4° C. A solution of 140 mg of aniline in 10 ml of 1.2N HCl is added dropwise over 1 h. The suspension is stirred for another hour at 0–5° C. The product is then isolated by filtration and washed well with 10 ml of 1.2N HCl, 10 ml of ethanol and 20 ml of acetone. The slightly green flakes are suspended in 50 ml of DMF and stirred for 30 min at room temperature and after being filtered again they are washed with acetone. The flakes are treated for 15 h at 120° C./100 mbar, after which they are of an intense blue which flops to violet.

EXAMPLE 15B

A small sample of the product of Example 15A is suspended for 30 min in 10 ml of 1N NaOH, filtered, washed and dried again. The flakes thus treated are of a slightly more intense blue and flop to violet.

EXAMPLE 16A

In a 250 ml flask, fitted with a reflux funnel, thermometer and dropping funnel, 2 g of aluminium flakes prepared according to Example 13B are suspended in 30 ml of 1.2N HCl and 10 ml of a 0.075M pyrrole solution in freshly prepared 1.2N HCl. With stirring, the sample is cooled to 4° C. in an ice bath. 548 mg of $(NH_4)_2S_2O_8$ in 80 ml of 1.2N HCl are added dropwise over 1 h from the dropping funnel.

The suspension is then filtered and washed well with 2×10 ml of 1.2N HCl, 30 ml of ethanol and 50 ml of acetone. The flakes obtained by filtration are of an intense green.

EXAMPLE 16B

The product of Example 16A is treated for 15 h at 120° .C/100 mbar. The flakes thus treated are of an intense green and flop to violet.

EXAMPLE 17A

To increase the wettability with isopropanol/water, the metal flakes to be used are degreased by continuous extraction in a Soxhlett apparatus with methylene chloride or acetone. If this pretreatment is not sufficient, the metal flakes can be suspended in a pH 10 buffer solution, if required with heating to 60° C., and stirred until wetting is visible. In a flask fitted with thermometer, reflux condenser and dropping funnel, 5 g of degreased aluminium flakes are suspended in a solution of 100 ml of isopropanol and 2.85 g of titanium tetraisopropoxylate and heated to reflux temperature. A solution of 50 ml of isopropanol and 1.8 ml of water is added over 3 h to the boiling suspension. Depending on the kind of metal flakes, different interference colours can be observed as a function of the stirring time or of the $TiO_2$ layer thickness. After 15 h, the coated metal flakes are isolated by filtration, washed with 3×100 ml of ethanol and 2×100 ml of acetone and dried at 120° C./100 mbar.

EXAMPLE 17B

The flakes of Example 17A are calcined at about 500° C. under argon, giving crystalline $TiO_2$ layers.

EXAMPLE 17C

The procedure of Example 17B is repeated, but varying the temperature and time of calcination. Depending on the conditions, different crystal modifications of the titanium oxide are obtained.

EXAMPLE 18

50 g of mica coated with $TiO_2$ (®Iriodin 97235, Merck) are suspended in 330 g of a 3% by weight aqueous solution of sulfonate-modified polyvinyl alcohol (®SK-5102, Kuraray), the pH of which is set to 4.5 with some 1N $HNO_3$, for 4 hours at room temperature to obtain the polyvinyl alcohol adsorbed on the mica flakes. After separation of them from the suspension, the flakes are thoroughly washed with water and suspended again in 525 g of a 0.7% aqueous solution of sodium dodecyl sulfate. 100 ml of a solution of 0.376 g ceric ammonium nitrate in 1N $HNO_3$ is then added dropwise, followed by dropwise addition of 7.5 ml of acrylonitrile. The graft polymerization of acrylonitrile onto the flakes is allowed to proceed at room temperature under nitrogen atmosphere for 2 hours. After polymerization, the flakes are isolated by filtration, washed with water and ethanol and dried.

The polyacrylonitrile-coated flakes are then heated under air in an electric furnace to 200° C. in 1 hour and further to 270° C. in 6.5 hours. They are then calcined 8 hours at 600° C. under a flow of nitrogen. The final product contains 1.16% of carbon, 0.11% of hydrogen and 0.44% of nitrogen and has an intense green interference color.

EXAMPLE 19

Example 18 is repeated with the exception that the flakes are calcined 8 h at 700° C. under a flow of nitrogen. The final product contains 0.92% of carbon, 0.10% of hydrogen and 0.31% of nitrogen and has an intense green interference color.

EXAMPLE 20

Example 18 is repeated with the exception that the flakes are calcined 8 h at 800° C. under a flow of nitrogen. The final product contains 0.71% of carbon, 0.10% of hydrogen and 0.21% of nitrogen and has an intense green interference color.

EXAMPLE 21

50 g of mica coated with $TiO_2$ (®Iriodin 100, Merck) are suspended in 330 g of a 3% aqueous solution of sulfonate-modified polyvinyl alcohol (®SK-5102, Kuraray), the pH of which is set to 4.5 with some 1N $HNO_3$, for 4 hours at room temperature to obtain the polyvinyl alcohol adsorbed on the mica flakes. After separation of flakes from the suspension, the flakes are thoroughly washed with water and suspended again in 525 g of water containing 3.6 g of sodium lauryl sulfate. 100 ml of a solution of 0.376 g ceric ammonium nitrate in 1N $HNO_3$ is then added dropwise, followed by dropwise addition of 10 ml of acrylonitrile. The graft polymerization of acrylonitrile onto the flakes is allowed to proceed at room temperature under nitrogen atmosphere for 2 hours. After polymerization, the flakes are isolated by filtration, washed with water and ethanol and dried.

The polyacrylonitrile-coated flakes are then heated under air in an electric furnace to 200° C. in 1 hour and further to 270° C. in 6.5 hours. They are then calcined for 1 hour at 800° C. under a flow of nitrogen. A shiny gray material is obtained. The final product contains 1.1% of carbon, <0.3% of hydrogen and 0.3% of nitrogen.

EXAMPLE 22

5 g of aluminium flakes pretreated according to Example 12A are suspended in a solution of 100 ml of isopropanol and 2.85 g of titanium tetraisopropoxylate and heated to reflux temperature. A solution of 50 ml of isopropanol and 1.8 ml of water is added dropwise over 3 h to the boiling suspension. After 15 h, the coated metal flakes are isolated by filtration, washed with 3×100 ml of ethanol and 2×100 ml of acetone and treated at 120° C./100 mbar for 15 h. The flakes are slightly violet.

EXAMPLE 23

2.3 g of the flakes of Example 22 are surface-treated according to Example 14 with N-(3-(trimethoxysilyl)propyl) pyrrole) in toluene, giving 2.3 g of slightly violet aluminium flakes.

EXAMPLE 24

2.0 g of the flakes of Example 23 are coated with polypyrrole in analogy to Examples 16A and 16B. The flakes are green and flop to grayish blue.

EXAMPLE 25

5 mg of the pigment of Examples 15A, 16B and 24 each are placed in a test tube (diameter 5 mm) and charged with 0.5 ml of CAB solution of the following composition:

| % by weight | product |
|---|---|
| 41.0 | cellulose acetobutyrate ™ CAB 531.1, 20% in butyl acetate/xylene 211 (Eastman Chemicals) |
| 1.5 | ® Nuodex Zirkonium Octoat 6 |
| 18.5 | ® Solvesso 150 |
| 21.5 | butyl acetate |
| 17.5 | xylene |

The test tube is stoppered with a rubber stopper and is shaken well. The suspension is stored in a test-tube rack for 2 weeks. After 2 weeks, no changes are found in any of the test tubes. A final assessment is made by adding 2 ml of acetone, shaking well and filtering. The flakes are washed with ethanol and acetone and dried. The color of the stored flakes is compared to that of the starting flakes. The color is identical in all cases.

EXAMPLE 26

0.2 g of the effect pigment of EXAMPLE 15A, 16B and 24 is mixed with 22.3 g of polyvinyl chloride, 11 g of dioctylphthalate and 0.66 g of dibutyltin dilaurate and processed to a thin film on a three-roll mill over 8 min at 160° C. The PVC films so obtained do not show any surface changes under the microscope at 500-fold magnification. All films are highly colored and have the respective color of the starting pigments. The films are weathered in a WOM (™Ci35 Weather-O-Meter, Atlas Corp.). The film containing the effect pigment of Example 15A shows slight lightening after 100 h which becomes more marked after 250 h and is strong after 500 h. The films containing the effect pigments of Examples 16B and 24 on the other hand show no changes eve n after 500 h.

EXAMPLE 27

First, a 5% effect pigment paint is prepared which consists of 2.0 g of the effect pigment of Example 15A, 16B or 24, 2.0 g of Solvesso 150, 10.8 g of the CAB solution of Example 25,14.4 g of ™Dynapol H 700 and 10.8 g of ®Maprenal MF 650. The first 2 components are slurried for 2 h and the other components are then added and dispersed for 5 min at 500 rpm, then for 60 min at 2000 rpm, in a ™Dispermat with a 3-disk impeller without grinding elements. The state of dispersion is assessed after 60 min under a microscope; if required stirring is continued for another 30 min. The 5% effect pigment paint is then adjusted to a spraying consistency of 0.8 poise (Epprecht viscosimeter) with a 1:1 mixture of xylene and 2-methoxy-1-propanol (®Dowanol).

The ready-to-spray effect pigment paint is sprayed on panels (black/white and aluminium panels) as a base coat, followed by a transparent top coat.

base coat: coating thickness=15–20 $\mu$m top coat: TSA lacquer (with 2% UV absorber)–coating thickness=40–50 $\mu$m flash-off: 2 h at room temperature stoving: 30 min at 130° C. in a circulating air oven The sprayed panels are then visually or colorimetrically measured. Some of the sprayed sample s are used for weathering tests.

The sprayed panels with the pigment of Example 15A are of an intense blue and flop to violet. The sprayed panels with the pigment of Example 16B are of an intense green and flop to violet. The sprayed panels with the pigment of Example 24 are of an intense green and flop to blueish gray. The weathering shows virtually identical results as in Example 26.

EXAMPLE 28

First, a 8% effect pigment paint is prepared which consists of 4.8 g of the effect pigment of Example 18, 19, 20 or 21, 4.8 g of Solvesso 150, 15.12 g of the CAB solution of Example 25, 20.1 6 g of ™Dynapol H 700 and 15.1 2 g of ®Maprenal MF 650. The first 2 components are slurried for 2 h and the other components are then added and dispersed for 5 m at 500 rpm, then for 30 min at 1500 rpm, in a ™Dispermat with a 3-disk impeller without grinding elements. The state of dispersion is assessed after 30 min under a microscope; if required, stirring is continued for another 30 min. The 8% effect pigment paint is then adjusted to a spraying consistency of 0.8 poise (Epprecht viscosimeter) with a 1:1 mixture of xylene and 2-methoxy-1-propanol (®Dowanol).

The ready-to-spray effect pigment paint is sprayed on panels (black/white and aluminum panels) as a base coat, followed by a transparent top coat.

base coat: coating thickness=15–20 µm top coat: TSA lacquer (with 2% UV absorber)–coating thickness=40–50 µm flash-off: 2 h at room temperature stoving: 30 min at 130° C. in a circulating air oven The sprayed panels are then visually or calorimetrically measured. Some of the sprayed samples are used for weathering tests.

The sprayed panels with the pigment of Example 18, 19 or 20 are of an intense yellowish green. The sprayed panels with the pigment of Example 21 are of a metallic gray.

What is claimed is:

1. A collection of composite plateletlike particles comprising a core and at least one coating layer consisting essentially of a compound having from 60 to 95% by weight of carbon and from 5 to 25% by weight of nitrogen, the balance to 100% being selected from elements of the group consisting of hydrogen, oxygen and sulfur.

2. A collection of particles according to claim 1, wherein the particles also comprise an intermediate coating between the core and the nitrogen doped carbon coating.

3. A collection of particles according to claim 2, wherein the core is a silicatic particle and the intermediate layer consists of a metal oxide, oxide hydrate or halide.

4. A collection of particles according to claim 3, wherein the intermediate layer consists of zirconium dioxide or titanium dioxide.

5. A collection of particles according to claim 2, wherein the core is a metallic flake and the intermediate layer consists of a metal oxide, oxide hydrate or halide.

6. A collection of particles according to claim 5, wherein the intermediate layer consists of silicium dioxide.

7. A collection of particles according to claim 1 or 2, wherein the particles also comprise an outer coating of a transparent or selectively absorbing dielectric material.

8. A collection of particles according to claim 7, wherein the transparent or selectively absorbing dielectric material is selected from the group consisting of $TiO_2$, $ZrO_2$, SiO, $SiO_2$, $SnO_2$, $GeO_2$, ZnO, $Al_2O_3$, $V_2O_5$, $Fe_2O_3$, $Cr_2O_3$, MgO, $MgF_2$, CuO or $PbTiO_3$, or a mixture thereof.

9. A collection of particles according to claim 2, wherein said intermediate layer has a thickness of from 0.01 to 1 µm.

10. A collection of particles according to claim 1, wherein the compound has from 70 to 90% by weight of carbon, from 13 to 22% by weight of nitrogen, from 0.5 to 5% by weight of hydrogen, and below 1% by weight of sulfur.

11. A collection of particles according to claim 1, wherein the number of particles, in which a single core is surrounded by a coating layer of the carbon and nitrogen containing compound is at least 80%, preferably at least 95%, of the total number of particles.

12. A collection of particles according to claim 1, wherein the core is a flat metallic or silicatic particle, graphite, a $Fe_2O_3$, $MoS_2$, talc or glass flake, or a plateletlike crystal of β-phthalocyanine, fluororubine, a red perylene or a diketopyrrolopyrrole.

13. A collection of particles according to claim 1, wherein said coating has a thickness of from 1 nm to 1 µm.

14. A process for preparing a collection of particles according to claim 1, comprising the steps of:

(a) suspending plateletlike particles in a liquid;

(b) optionally adding a surface modifier, a polymerisation catalyst or both;

(c) before or after step (b), adding one or more polymers containing nitrogen and carbon atoms, or one or more monomers which are capable to polymerize to said polymer;

(d) effecting a polymeric coating layer to be formed on the surface of said plateletlike particles from the polymers or monomers added at step (c);

(e) isolating said plateletlike particles having said polymeric coating layer from the suspension; and (f) heating said plateletlike particles having said polymeric coating layer to a temperature of from 100° C. to 1000° C. in a gaseous environment.

15. A process according to claim 14, wherein the polymer is a polypyrrole, a polyamide, a polyaniline, a polyurethane, a nitrile rubber or a melamin-formaldehyde resin.

16. A process according to claim 14, wherein both a surface modifier and a polymerisation catalyst are added in step (b).

17. A process according to claim 14, wherein in step (f) the particles are first heated to 100° C. to 300° C. in an oxygen-containing gas, then to 200 to 1000° C. in an inert gas.

18. A substance composition comprising an effective pigmenting amount of a pigment according to claim 1 and a high molecular weight organic material.

19. A method for pigmenting high molecular weight organic material by incorporating an effective pigmenting amount of an effect pigment according to claim 1 or of an effect pigment composition according to claim 18 into said high molecular weight organic material.

* * * * *